2,877,234
Patented Mar. 10, 1959

2,877,234

ESTERS AND SALTS OF γ-(3-INDOYL)-γ-KETO-PROPYLPHOSPHONIC ACIDS

Jacob Szmuszkovicz, Portage Township, Kalamazoo County, Mich., assignor to The Upjohn Company, Kalamazoo, Mich., a corporation of Michigan No Drawing. Application June 27, 1957
Serial No. 668,307

11 Claims. (Cl. 260—319)

The present invention relates to novel organic compounds and is more particularly concerned with mono- and dialkyl esters of γ-(3-indolyl)-γ-keto-propylphosphonic acids, and the alkali-metal salts of the mono esters of γ-(3-indolyl)-γ-keto-propylphosphonic acids.

The novel dialkyl esters of γ-(3-indolyl)-γ-keto-propylphosphonic acids possess valuable pharmacological activity. These compounds have sedative and analgetic activity. In addition, the dialkyl esters have shown herbicidal properties.

The dialkyl esters are also valuable intermediates in the preparation of the pharmacologically active monoalkyl esters of γ-(3-indolyl)-γ-keto-propylphosphonic acids and the alkali-metal salts thereof. The novel monoalkyl esters and alkali-metal salts have shown analgetic activity.

The novel compounds of this invention can be represented by the following general formula:

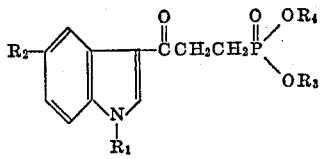

wherein $R_1$ represents hydrogen or an alkyl radical containing from one to six carbon atoms, inclusive, such as methyl, ethyl, propyl, isopropyl, butyl, amyl and hexyl. $R_2$ represents hydrogen or hydroxy. In the preparation of the hydroxy substituted compounds it is advantageous to prepare the benzyloxy derivatives, i. e., the mono- and dialkyl esters of γ-[3-(5-benzyloxy)-indolyl]-γ-keto-propylphosphonic acids, and subsequently debenzylate the benzyloxy derivative to produce the desired hydroxy substituted compound. The benzyloxy radical is converted to the desired hydroxy radical by hydrogenolysis in the presence of a catalyst, advantageously palladium on charcoal, employing the general procedure more fully disclosed in U. S. Patent 2,708,197. Benzyloxy radicals which are so employed include benzyloxy, benzhydryloxy, halobenzyloxy, e. g., para-chlorobenzyloxy and para,para'-dichlorobenzhydryloxy, alkylbenzyloxy, e. g., para-methylbenzyloxy and para,para'-dimethylbenzhydryloxy, alkoxybenzyloxy, e. g., para-methoxybenzyloxy and para,para'-dimethoxybenzhydryloxy, and the like. $R_3$ represents a primary or secondary lower-alkyl radical containing from one to four carbon atoms, inclusive, such as methyl, ethyl, propyl, butyl, isopropyl, and isobutyl. $R_4$ represents hydrogen, a primary or secondary lower-alkyl radical containing from one to four carbon atoms, inclusive, such as methyl, ethyl, propyl, butyl, isopropyl, and isobutyl, or an alkali-metal such as sodium, potassium, and the like.

The novel dialkyl esters of the present invention are produced by reacting a 2-sec-aminoethyl 3-indolyl ketone quaternary ammonium or acid addition salt with a primary or secondary trialkyl phosphite to produce a dialkyl ester of a γ-(3-indolyl)-γ-keto-propylphosphonic acid, employing the general procedure described by Myers et al., J. Amer. Chem. Soc. 77, 3101, 1955.

The monoalkyl esters of γ-(3-indolyl)-γ-keto-propylphosphonic acids are prepared by subjecting the dialkyl esters to alkaline hydrolysis utilizing, e. g., sodium hydroxide, potassium hydroxide, sodium carbonate, and the like. The hydrolysis is advantageously conducted at a temperature between about eighty and about 100 degrees centigrade for a period of between about two to about ten hours, preferably about eight hours at about 95 degrees centigrade. It is pointed out that when $R_1$ and $R_2$, as shown in the above structural formula, are hydrogen and the alkyl radicals $R_3$ and $R_4$ are derived from a primary trialkyl phosphite, then the alkaline hydrolysis ordinarily results in a mixture of products, viz., the monoalkyl ester of a γ-[3-(1-alkyl)-indolyl]-γ-keto-propylphosphonic acid and the monoalkyl ester of γ-(3-indolyl)-γ-keto-propylphosphonic acid. This is by virtue of the migration of one of the primary alkyl radicals to the 1-position of the indole nucleus, the extent of such migration depending upon the particular primary alkyl radical. The migration does not occur when $R_3$ and $R_4$ are derived from secondary trialkyl phosphites such as triisopropyl phosphite. If desired, the mixture of compounds can be separated into the individual components according to conventional procedure.

However, such mixtures can be avoided and the compounds produced separately, if so desired. For example, the monoalkyl esters of γ-(3-indolyl)-γ-keto-propylphosphonic acid (i. e., $R_1$ and $R_2$ are hydrogen) are prepared by reacting an alcoholic solution of γ-(3-indolyl)-γ-keto-propylphosphonic acid at room temperature (about twenty to thirty degrees centigrade) with an ethereal solution containing an equimolar amount of a diazoalkane having from one to four carbon atoms, inclusive, e. g., reacting one mole of γ-(3-indolyl)-γ-keto-propylphosphonic acid with one mole of diazopropane results in the preparation of one mole of the monopropyl ester of γ-(3-indolyl)-γ-keto-propylphosphonic acid. The γ-(3-indolyl)-γ-keto-propylphosphonic acid can be prepared from its monoisopropyl ester by heating the monoisopropyl ester in the presence of hydrogen ion and a polar solvent such as water, acetic acid, and the like.

The monoalkyl esters of γ-[3-(1-alkyl)-indolyl]-γ-keto-propylphosphonic acids are produced separately by reacting a 2-sec-aminoethyl 3-(1-alkyl)-indolyl ketone quaternary ammonium or acid addition salt with a primary or secondary trialkyl phosphite to produce a dialkyl ester of a γ-[3-(1-alkyl)-indolyl]-γ-keto-propylphosphonic acid, followed by alkaline hydrolysis of the dialkyl ester.

The preparation of mixed dialkyl esters can be carried out by reacting a diazoalkane as exemplified herein and a monoalkyl ester of a γ-(3-indolyl)-γ-keto-propylphosphonic acid. For example, propyl butyl γ-(3-indolyl)-γ-keto-propylphosphonate can be prepared by reacting propyl γ-(3-indolyl)-γ-keto-propylphosphonate with an equimolar amount of diazobutane to prepare the mixed diester, namely, propyl butyl γ-(3-indolyl)-γ-keto-propylphosphonate.

The alkali-metal salts of the monoalkyl esters of γ-(3-indolyl)-γ-keto-propylphosphonic acids are prepared by reacting a monoalkyl ester with a stoichiometric amount of alkali-metal (including ammonium) hydroxide or carbonate such as ammonium hydroxide, sodium hydroxide, potassium hydroxide, sodium carbonate, sodium bicarbonate, potassium carbonate, and the like.

The primary and secondary trialkyl phosphites which are employed as starting reactants in the present invention are prepared in known manner, e. g., as disclosed in "Organic Reactions," vol. VI, page 286, 1951—John Wiley and Sons, Inc. Representative trialkyl phosphites include trimethyl phosphite, triethyl phosphite, tripropyl phosphite, tributyl phosphite, triisobutyl phosphite, triisopropyl phosphite, tri-(sec-butyl) phosphite, and the like.

The diazoalkanes employed in the present invention can be prepared according to the procedure disclosed in J. Org. Chem. 21, 1017, 1956. Representative diazolkanes which can be employed include diazomethane, diazoethane, diazopropane, diazobutane, and the like.

The starting 2-sec-aminoethyl 3-indolyl ketone quaternary ammonium and acid addition salts can be prepared by reacting a 3-indolyl methyl ketone with formaldehyde and a dialkylamine or heterocyclic secondary amine in the presence of an inert solvent. The reaction is generally carried out under acid conditions, i. e., a pH of less than seven. Inert solvents can include methanol, ethanol, and isoamyl alcohol although when aqueous formaldehyde is employed no solvent is necessary. Representative amines which can be employed include dimethylamine, diethylamine, diisopropylamine, pyrrolidine, piperidine, morpholine, and the like. The acid conditions generally necessary for completion of the reaction can be brought about by employing the amine as an acid addition salt such as the hydrochloride, sulfate, hydrobromide, and the like, or the acid conditions can be brought about by the addition of an acid such as acetic, hydrochloric, and the like, to the reaction mixture. The reaction is carried out at a temperature between about fifty and about 100 degrees centigrade and advantageously at a temperature between about 65 and about 85 degrees centigrade. The thus-produced 2-sec-aminoethyl 3-indolyl ketone acid addition salt can be recovered by conventional procedure, such as by filtration after cooling the reaction mixture. The 2-sec-aminoethyl 3-indolyl ketone free base can be produced from the acid addition salt and then converted to the quaternary ammonium salt. The free base can be produced by dissolving the acid addition salt in water, adding excess alkali-metal hydroxide to the aqueous mixture, extracting the mixture with ether, washing the ether extracts with water, drying the washed product, and evaporating to dryness. The quaternary ammonium salts can be prepared by reacting the free base in an inert solvent with a suitable quaternary ammonium salt-forming compound such as methyl iodide, ethyl bromide, butyl iodide, benzyl chloride, and the like.

The 3-indolyl methyl ketones employed in the preparation of 2-sec-aminoethyl 3-indolyl ketones can be prepared from 3-unsubstituted indoles by the processes outlined in "Heterocyclic Compounds," Elderfield, vol. 3, page 44, 1952—John Wiley and Sons, Inc. The 5-benzyloxy-3-unsubstituted indoles can be prepared according to the procedure disclosed by Burton et al., J. Chem. Soc. 1726, 1937. Representative 5-benzyloxyindoles include the following: 5-benzyloxyindole, 5-benzhydryloxyindole, 5-(para-chlorobenzyloxy)-indole, 5-(para,para'-dichlorobenzhydryloxy)-indole, 5-(para-methoxybenzyloxy)-indole, 5-(para,para'-dimethoxybenzhydryloxy)-indole, 5-(para-ethylbenzyloxy)-indole, 5-(para,para'-diethylbenzhydryloxy)-indole, and the like. A 1-alkyl substituent can be attached by alkylation of a 1-unsubstituted 3-indolyl methyl ketone by using the procedure disclosed by Baker et al., J. Chem. Soc. 958, 1940, which involves the reaction of a 1-unsubstituted indole with an alkyl halide, e. g., methyl iodide, ethyl iodide, isobutyl bromide, hexyl iodide, and the like, in the presence of an alkali-metal alkoxide, or by using the procedure disclosed by Chemical Abstracts 49, 1006d (1955) which involves the reaction of a 1-unsubstituted indole with a dialkyl sulfate in the presence of an alkali-metal hydroxide.

The following examples are illustrative of the process and products of the present invention, but are not to be construed as limiting.

EXAMPLE 1

*Diethyl ester of γ-[3-(1-ethyl)-indolyl]-γ-keto-propylphosphonic acid*

A. 2-DIMETHYLAMINOETHYL 3-(1-ETHYLINDOLYL) KETONE METHIODIDE

A mixture of 49.32 grams of 1-ethyl-3-acetylindole [C. A. 49, 1006d (1955)], 25.8 grams of dimethylamine hydrochloride, and 15.85 grams of para-formaldehyde in 400 milliliters of absolute ethanol was refluxed for nineteen hours. The resulting solution was evaporated to dryness on the steam bath under vacuum. The residue was dissolved in 350 milliliters of water and the solution was extracted twice with ether.

The brown aqueous solution was made basic with a solution of 33.6 grams of potassium hydroxide in 110 milliliters of water, with ice-bath cooling. The resulting mixture was extracted three times with ether. The combined ether extracts were washed with saturated aqueous sodium chloride solution, dried with anhydrous sodium sulfate, and evaporated to give 56 grams (87 percent yield) of 2-dimethylaminoethyl 3-(1-ethylindolyl) ketone as an oil.

Fifteen grams of the 2-dimethylaminoethyl 3-(1-ethylindolyl) ketone was dissolved in 65 milliliters of methanol. The solution was cooled with an ice bath and then 17.5 grams of methyl iodide was added with swirling during a ten minute period. The mixture was kept at zero degrees centigrade for one-half hour and then at 25 degrees centigrade for forty minutes. The resulting crystals were filtered, washed with methanol and then with ether, to produce 2-dimethylaminoethyl 3-(1-ethylindolyl) ketone methiodide which melted at 192 to 194 degrees centigrade. Recrystallization from methanol afforded pale yellow needles, melting point 192–194 degrees centigrade.

B. DIETHYL ESTER OF γ-[3-(1-ETHYL)-INDOLYL]-γ-KETO-PROPYLPHOSPHONIC ACID

A mixture of 11.2 grams of 2-dimethylaminoethyl 3-(1-ethylindolyl) ketone methiodide and fifty grams of triethyl phosphite was refluxed for two hours; the bath temperature was 190 to 200 degrees centigrade. Some solid material collected in the mouth of the condenser but most of it was present in suspension. The suspension was cooled, diluted with 100 milliliters of benzene and allowed to stand for about ten hours. The suspension was filtered in order to remove the solid material (trimethylethylammonium iodide). The filtrate was washed once with cold water and twice with saturated aqueous sodium chloride solution. The washed solution after being dried with anhydrous sodium sulfate was evaporated on the steam bath at reduced pressure down to about 0.3 millimeter of mercury pressure, to give nine grams of crude diethyl ester of γ-[3-(1-ethyl)-indolyl]-γ-keto-propylphosphonic acid as a yellow oil. A 1.3 gram portion of this product was distilled from an oil-jacketed flask at 0.01 millimeter of mercury pressure (bath temperature 210 to 225 degrees centigrade), 1.2 grams of the purified diethyl ester being thus obtained as a pale yellow oil; $n_D^{25}$ 1.5549.

*Analysis.*—Calcd. for $C_{17}H_{24}NO_4P$: C, 60.52; H, 7.17; N, 4.15; P, 9.18. Found: C, 59.95; H, 7.39; N, 4.17; P, 8.99.

EXAMPLE 2

*Monoethyl ester of γ-[3-(1-ethyl)-indolyl]-γ-keto propylphosphonic acid*

A mixture of 0.8 gram of the oily diethyl ester of γ-[3-(1-ethyl)-indolyl]-γ-keto-propylphosphonic acid and a solution of 2.64 grams of potassium hydroxide in 7.92 milliliters of water was refluxed with stirring for seven hours. The resulting solution was cooled with an ice bath and acidified with 4.6 milliliters of concentrated hydrochloric acid. The resulting yellow oil was extracted three times with chloroform. The combined chloroform extracts were washed successively with water and saturated aqueous sodium chloride solution and then dried with anhydrous magnesium sulfate. The dried chloroform solution was evaporated to dryness at about 25 degrees centigrade and reduced pressure. There was thus obtained 0.673 gram of crude, yellow monoethyl ester of γ-[3-(1-ethyl)-indolyl]-γ-keto-propylphosphonic acid which melted at 103 to 105 degrees centrigrade. Two recrystallizations from chloroform-petroleum ether gave the purified monoethyl ester which melted at 118.5 to 119.5 degrees centigrade.

Analysis.—Calcd. for $C_{15}H_{20}NO_4P$: C, 58.25; H, 6.52; N, 4.53; P, 10.01; N. E. 309.29. Found: C, 58.32; H, 6.62; N, 4.75; P, 9.88; N. E. 310.0.

The monoethyl ester was dissolved in water containing sodium hydroxide in an amount which was equimolar with respect to the ester. The solution was evaporated under vacuum at about 25 degrees centrigrated to produce monosodium monoethyl γ-[3-(1-ethyl)-indolyl-γ-keto-propylphosphonate.

EXAMPLE 3

*Diethyl ester of γ-(3-indolyl)-γ-keto-propylphosphonic acid*

A. 2-DIMETHYLAMINOETHYL 3-INDOLYL KETONE METHIODIDE

A mixture of 15.9 grams of 3-indolyl methyl ketone, (Saxton, J. Chem. Soc. 1952, 3592), 8.15 grams of dimethylamine hydrochloride, 4.5 grams of para-formaldehyde and 150 milliliters of absolute ethanol was refluxed for 24 hours. The clear brown solution was allowed to stand at 25 degrees centigrade for 24 hours and was then evaporated under vacuum to a viscous oil. Water (200 milliliters) was added and the mixture was filtered. The aqueous filtrate was extracted twice with ether. The clear aqueous solution was then cooled with an ice bath and made alkaline with a cold solution of potassium hydroxide (ten grams) in 25 milliliters of water. The resulting mixture was extracted three times with chloroform and the combined chloroform extracts were washed twice with saturated aqueous sodium chloride solution, and dried over anhydrous sodium sulfate. The chloroform was removed by evaporation to produce 13.1 grams of 2-dimethylaminoethyl 3-indolyl ketone free base.

Methyl iodide (1.42 grams; 0.01 mole) was added to a solution of 1.08 grams of 2-dimethylaminoethyl 3-indolyl ketone free base in six milliliters of methanol cooled, with ice bath cooling. The mixture was allowed to stand in the cold for four hours. The mixture was filtered and the precipitate washed with cold methanol to produce 1.53 grams of 2-dimethylaminoethyl 3-indolyl ketone methiodide which melted at 205.5 to 207.5 degrees centigrade.

Analysis.—Calcd. for $C_{14}H_{19}IN_2O$: C, 46.94; H, 5.35; N, 7.82; I, 35.43; C, 47.03; H, 5.50; N, 7.58; I, 35.39.

B. DIETHYL ESTER OF γ-(3-INDOLYL)-γ-KETO-PROPYL-PHOSPHONIC ACID

A mixture of 21.4 grams (0.06 mole) of 2-dimethylaminoethyl 3-indolyl ketone methiodide and 100 grams (0.6 mole) of triethyl phosphite was refluxed gently for three hours (bath temperature 185 to 195 degrees centigrade). A crystalline solid collected in the upper part of the flask and in the mouth of the condenser, and a clear yellow solution was obtained. The solution was allowed to cool to about 25 degrees centigrade, whereupon 100 milliliters of benzene was added and the resulting suspension was allowed to stand for about ten hours. The suspension was filtered to remove trimethylethylammonium iodide.

The filtrate was washed twice with cold water and once with saturated aqueous sodium chloride solution. The washed solution was then dried over anhydrous magnesium sulfate and was evaporated at reduced pressure down to about 0.1 millimeter of mercury pressure, in order to remove the excess triethyl phosphite. A quantitative yield of crude diethyl ester of γ-(3-indolyl)-γ-keto-propylphosphonic acid was obtained. The product was a yellow oil which crystallized on standing for a few weeks. After two recrystallizations from chloroform-ether, elongated needles were obtained which melted between 106 and 108.5 degrees centigrade.

Analysis.—Calcd. for $C_{15}H_{20}NO_4P$: C, 58.25; H, 6.52; N, 4.53; P, 10.01. Found: C, 57.88; H, 6.62; N, 4.42; P, 10.04.

EXAMPLE 4

*Mixture of monoethyl ester of γ-[3-(1-ethyl)-indolyl]-γ-keto-propylphosphonic acid and monoethyl ester of γ-(3-indolyl)-γ-keto-propylphosphonic acid*

A mixture of 0.03 mole of the crude, oily diethyl ester of γ-(3-indolyl)-γ-keto-propylphosphonic acid and a solution of 16.8 grams of potassium hydroxide in 95 milliliters of water was heated with stirring on the steam bath for seven hours, a clear yellow solution being obtained after the first hour. The clear solution was then allowed to stand at about 25 degrees centigrade for about ten hours and was then cooled in ice and acidified with 29 milliliters of concentrated hydrochloric acid diluted with 25 milliliters of water. The resulting yellow oil was extracted three times with chloroform. The combined chloroform extracts were washed successively with water and saturated aqueous sodium chloride solution, and were then dried over anhydrous magnesium sulfate. The solution was then evaporated to dryness at about 25 degrees centigrade at reduced pressure. There was thus obtained 7.1 grams of a yellow oil which upon several hours standing changed to an oily solid, consisting of 92 percent of the monoethyl ester of γ-[3-(1-ethyl)-indolyl]-γ-keto-propylphosphonic acid and eight percent of the monoethyl ester of γ-(3-indolyl)-γ-keto-propylphosphonic acid, as determined by quantitative infrared comparison with samples of the pure esters.

The oily solid was recrystallized from methanol-ether-petroleum ether and then from ethyl acetate-ether. The resulting monoethyl ester of γ-[3-(1-ethyl)-indolyl]-γ-keto-propylphosphonic acid was identical to the product of Example 2.

EXAMPLE 5

*Dimethyl ester of γ-[3-(1-ethyl)-indolyl]-γ-keto-propylphosphonic acid*

A mixture of 7.45 grams of 2-dimethylaminoethyl 3-(1-ethylindolyl) ketone methiodide and 24.8 grams of trimethyl phosphite was refluxed for three hours. The bath temperature was 150 to 172 degrees centigrade. The resulting suspension was cooled, fifty milliliters of benzene was added, and the suspension was filtered. The filtrate was washed successively with cold water and saturated aqueous sodium chloride solution. The washed solution was then dried over sodium sulfate and was evaporated to dryness under vacuum to produce 5.04 grams of yellow oil. The yellow oil was dissolved in 100 milliliters of ether, the solution was filtered, and evaporated to cloudiness. Seeding induced immedate crystallization of the dimethyl ester of γ-[3-(1-ethyl)-indolyl]-γ-keto-propylphosphonic acid; the yield was 3.9 grams and the melting point was 72 to 73.5 degrees centigrade. An additional one gram was obtained as a second crop.

Analysis.—Calcd. for $C_{15}H_{20}NO_4P$: C, 58.25; H, 6.52; N, 4.53; P, 10.01. Found: C, 58.02; H, 6.54; N, 4.46; P, 10.16.

EXAMPLE 6

*Diethyl ester of γ-[3-(1-methyl)-indolyl]-γ-keto-propylphosphonic acid*

In the same manner as shown in Example 1, 2-dimethylaminoethyl 3 - (1 - methylindolyl) - ketone hydrochloride was prepared using 1-methyl-3-acetylindole instead of 1-ethyl-3-acetylindole, isolating the product by evaporating the reaction mixture, and recrystallizing the residue from methanol-ether.

A mixture of 1.7 grams of 2-dimethylaminoethyl 3-(1-methylindolyl)-ketone hydrochloride and 10.6 grams of triethyl phosphite was heated at a bath temperature of 180 to 195 degrees centigrade for 65 minutes. The resulting solution was cooled and diluted with 150 milliliters of benzene. The benzene solution was washed once with water, twice with saturated aqueous sodium chloride solution, dried over anhydrous sodium sulfate, and evaporated to dryness on the steam bath at reduced pressure to produce the diethyl ester of γ-[3-(1-methyl)-indolyl]-γ-keto-propylphosphonic acid in substantially quantitative yield.

EXAMPLE 7

*Monoethyl ester of γ-[3-(1-methyl)-indolyl]-γ-keto-propylphosphonic acid*

The above diethyl ester of γ-[3-(1-methyl)-indolyl]-γ-keto-propylphosphonic acid was heated on a steam bath with stirring for eight hours with a solution of 3.6 grams of potassium hydroxide in 21 milliliters of water. The resulting clear, brown solution was cooled and acidified with ten milliliters of concentrated hydrochloric acid, and this mixture was extracted three times with chloroform. The combined chloroform extracts were washed twice with saturated aqueous sodium chloride solution, dried with anhydrous sodium sulfate, and evaporated to dryness at about 25 degrees centigrade under reduced pressure. The residual oil was triturated with warm ethyl acetate, to obtain the monoethyl ester of γ-[3-(1-methyl)-indolyl]-γ-keto-propylphosphonic acid as a yellow solid which had a melting point of 195 to 200 degrees centigrade.

EXAMPLE 8

*Dimethyl ester of γ-(3-indolyl)-γ-keto-propylphosphonic acid*

A mixture of 35.8 grams of 2-dimethylaminoethyl 3-indolyl ketone methiodide and 124 grams of trimethyl phosphite was heated for three and one-half hours at a bath temperature of 153 to 163 degrees centigrade. The reaction mixture was cooled, diluted with 100 milliliters of benzene, and allowed to stand for about ten hours. The precipitated tetramethylammonium iodide was removed by filtration and the yellow filtrate was evaporated to dryness under vacuum. The resulting oily residue was dissolved in chloroform; the solution was washed twice with water, once with saturated aqueous sodium chloride solution, and dried over anhydrous sodium sulfate. The dried chloroform solution was evaporated at about 25 degrees centigrade under vacuum, to give 21.6 grams of the dimethyl ester of γ-(3-indolyl)-γ-keto-propylphosphonic acid as an oil. A sample of the oily dimethyl ester was crystallized from methanol-ether-petroleum ether in the cold, and then recrystallized successively from benzene and from benzene-ether. The dimethyl ester thus purified melted between 123.5 and 125 degrees centigrade.

*Analysis.*—Calcd. for $C_{13}H_{16}NO_4P$: C, 55.51; H, 5.74; N, 4.98. Found: C, 55.64; H, 5.67; N, 4.75.

EXAMPLE 9

*Mixture of monomethyl ester of γ-(3-indolyl)-γ-keto-propylphosphonic acid and monomethyl ester of γ-[3-(1-methyl)-indolyl]-γ-keto-propylphosphonic acid*

A mixture of 19.7 grams of the dimethyl ester of γ-(3-indolyl)-γ-keto-propylphosphonic acid, 19.6 grams of potassium hydroxide and 75 milliliters of water was heated on the steam bath with stirring for four hours. The solution was filtered, cooled and acidified with 33 milliliters of concentrated hydrochloric acid. The resulting precipitate was filtered, washed with water, and dried to give 14.4 grams of monomethyl ester product, melting at 126 degrees centigrade with effervescence, and consisting of approximately 79 percent of the monomethyl ester of γ-(3-indolyl)-γ-keto-propylphosphonic acid and 21 percent of the monomethyl ester of γ-[3-(1-methyl)-indolyl]-γ-keto-propylphosphonic acid. This composition was determined by esterifying the mixed monomethyl ester product with diazomethane, and carrying out a quantitative infrared assay on the resulting mixed dimethyl ester product.

EXAMPLE 10

*Diisopropyl ester of γ-(3-indolyl)-γ-keto-propylphosphonic acid*

A mixture of 35.8 grams of 2-dimethylaminoethyl 3-indolyl ketone methiodide and 208 grams of triisopropyl phosphite was refluxed for 3.5 hours. The resulting suspension was cooled, diluted with 100 milliliters of benzene, allowed to stand for a few minutes, and filtered to remove trimethylisopropylammonium iodide. After a few minutes a colorless material started to crystallize in the filtrate. The crystals were recovered by filtration, washed successively with benzene and water, and dried to give 14.6 grams of the diisopropyl ester of γ-(3-indolyl)-γ-keto-propylphosphonic acid which melted between 128 and 129.5 degrees centigrade. The filtrate was evaporated to dryness under vacuum and the oily residue was dissolved in methylene chloride. The solution was washed with water, then with saturated aqueous sodium chloride solution, and dried over anhydrous sodium sulfate. The solution was evaporated to dryness at about 25 degrees centigrade under vacuum to give an oily residue which crystallized on standing about ten hours. The crystalline material was triturated with ether to give an additional 9.78 grams of the diisopropyl ester of γ-(3-indolyl)-γ-ketopropylphosphonic acid, melting point 127 to 128 degrees centigrade. An analytical sample prepared by recrystallization from benzene-petroleum ether had a melting point of 129 to 130 degrees centigrade.

*Analysis.*—Calcd. for $C_{17}H_{24}NO_4P$: C, 60.52; H, 7.17; N, 4.15. Found: C, 60.89; H, 7.40; N, 4.17.

EXAMPLE 11

*Monoisopropyl ester of γ-(3-indolyl)-γ-keto-propylphosphonic acid*

A mixture of 13.6 grams of the diisopropyl ester of γ-(3-indolyl)-γ-keto-propylphosphonic acid, 12.3 grams of potassium hydroxide and 110 milliliters of water was heated on the steam bath with stirring for 22 hours. The mixture was cooled and extracted twice with ether. The aqueous alkaline solution was cooled and acidified with 21 milliliters of concentrated hydrochloric acid. The resulting precipitate was recovered by filtration, washed with water, and dried to give 11.1 grams of crude monoisopropyl ester of γ-(3-indolyl)-γ-keto-propylphosphonic acid which melted between 155 and 157 degrees centigrade with effervescence. One gram of monoisopropyl ester of γ-(3-indolyl)-γ-keto-propylphosphonic acid was dissolved in 950 milliliters of acetone and the solution was evaporated to about 100 milliliters whereupon crystallization began. Colorless plates of monoisopropyl ester of γ-(3-indolyl)-γ-keto-propylphosphonic acid were obtained which melted between 173 and 174.5 degrees centigrade.

*Analysis.*—Calcd. for $C_{14}H_{18}NO_4P$: C, 56.95; H, 6.14; N, 4.74. Found: C, 57.19; H, 6.29; N, 4.73.

The monoisopropyl ester was dissolved in an excess of dilute ammonium hydroxide. The solution was evaporated under vacuum at about 25 degrees centigrade to obtain monoammonium monoisopropyl γ-(3-indolyl)-γ-keto-propylphosphonate.

EXAMPLE 12

*Dimethyl ester of γ-[3-(5-benzyloxy)-indolyl]-γ-keto-propylphosphonic acid*

A mixture of 25.16 grams of 2-dimethylaminoethyl 3-(5-benzyloxy)-indolyl ketone hydrochloride and 86.8 grams of trimethyl phosphite was heated for three hours at a bath temperature of 155 to 158 degrees centigrade. The excess of trimethyl phosphite was distilled under vacuum. The residue was cooled in ice and diluted with 100 milliliters of benzene and 100 milliliters of cold water. A thick colorless precipitate was formed, 25 milliliters of methanol was added, and the mixture was filtered to yield 16.23 grams of crude, solid product. The product was recrystallized from eighty milliliters of methanol and 100 milliliters of ether to yield 7.59 grams of dimethyl ester of γ-[3-(5-benzyloxy)-indolyl]-γ-ketopropylphosphonic acid which melted between 146 and 146.5 degrees centigrade. A second crop which amounted to 4.56 grams of product was also obtained. The melting point of an analytical sample obtained by recrystallization from methanol-ether was 147.5 to 148 degrees centigrade.

Analysis.—Calcd. for $C_{20}H_{22}NO_5P$: C, 62.01; H, 5.72; N, 3.61; P, 7.99. Found: C, 61.75; H, 5.33; N, 3.81; P, 8.03.

EXAMPLE 13

*Monomethyl ester of γ-[3-(5-benzyloxy)-indolyl]-γ-keto-propylphosphonic acid*

A mixture of 13.22 grams of dimethyl ester of γ-[3-(5-benzyloxy)-indolyl]-γ-keto-propylphosphonic acid, 9.1 grams of potassium hydroxide and 35 milliliters of water was heated on a steam bath with stirring for eight hours. The mixture was cooled and acidified with 26 milliliters of concentrated hydrochloric acid. An oily solid was produced, 800 milliliters of chloroform was added, and the solid material was recovered by filtration. The solid was washed with chloroform, then with water, and dried, to yield 11.21 grams of the monomethyl ester of γ-[3-(5-benzyloxy)-indolyl]-γ-keto-propylphosphonic acid which melted between 191 and 192.5 degrees centigrade. The compound after two recrystallizations from dimethylformamide-ether melted between 196.5 and 197.5 degrees centigrade.

EXAMPLE 14

*Diethyl ester of γ-[3-(5-benzyloxy)-indolyl]-γ-keto-propylphosphonic acid*

A mixture of thirty grams of 2-dimethylaminoethyl 3-(5-benzyloxy)-indolyl ketone hydrochloride and 140 grams of triethyl phosphite was heated (bath temperature 180 to 190 degrees centigrade) for 2.75 hours. The solution was cooled, diluted with 100 milliliters of benzene, and allowed to stand for ten hours. The mixture was filtered and the solid thus recovered was washed with benzene and dried, to yield 22.5 grams of diethyl ester of γ-[3-(5-benzyloxy)-indolyl]-γ-keto-propylphosphonic acid having a melting point between 166.5 and 167.5 degrees centigrade. An analytical sample prepared by recrystallization from ethanol melted between 169.5 and 170 degrees centigrade.

Analysis.—Calcd. for $C_{22}H_{26}NO_5P$: C, 63.60; H, 6.31; N, 3.37; P, 7.45. Found: C, 63.91; H, 6.63; N, 3.64; P, 6.98.

In the same manner other dialkyl esters of γ-[3-(5-benzloxy)-indolyl]-γ-keto-propylphosphonic acid are prepared by reacting a 2-sec-aminoethyl 3-indolyl ketone quaternary ammonium salt or acid addition salt with a primary or secondary trialkyl phosphite, e. g., diisopropyl ester of γ-[3-(5-benzyloxy)-indolyl]-γ-keto-propylphosphonic acid is prepared by reacting triisopropyl phosphite with 2-dimethylaminoethyl 3-(5-benzyloxy)-indolyl ketone hydrochloride; dibutyl ester of γ-[3-(5-benzyloxy)-indolyl]-γ-keto-propylphosphonic acid is prepared by reacting tributyl phosphite with 2-dimethylaminoethyl 3-(5-benzyloxy)-indolyl ketone hydrochloride; dipropyl ester of γ-[3-(5-benzyloxy)-indolyl]-γ-keto-propylphosphonic acid is prepared by reacting tripropyl phosphite with 2-dimethylaminoethyl 3-(5-benzyloxy)-indolyl ketone sulfate; dimethyl ester of γ-[3-methyl-5-benzyloxy)-indolyl]-γ-keto-propylphosphonic acid is prepared by reacting trimethyl phosphite with 2-dimethylaminoethyl 3-(1-methyl-5-benzyloxy)-indolyl ketone hydrochloride; diethyl ester of γ-[3-(1-ethyl-5-benzyloxy)-indolyl]-γ-keto-propylphosphonic acid is prepared by reacting triethyl phosphite with 2-dimethylaminoethyl 3-(1-ethyl-5-benzyloxy)-indolyl ketone sulfate; dipropyl ester of γ-[3-(1-butyl-5-benzyloxy)-indolyl]-γ-keto-propylphosphonic acid is prepared by reacting tripropyl phosphite with 2-dimethylaminoethyl 3-(1-butyl-5-benzyloxy)-indolyl ketone hydrochloride; and dibutyl ester of γ-[3-(1-hexyl-5-benzyloxy)-indolyl]-γ-keto-propylphosphonic acid is prepared by reacting tributyl phosphite with 2-dimethylamino-ethyl 3-(1-hexyl-5-benzyloxy)-indolyl ketone ethobromide.

EXAMPLE 15

*Monoethyl ester of γ-[3-(5-benzyloxy)-indolyl]-γ-keto-propylphosphonic acid*

A mixture of fifteen grams of diethyl ester of γ-[3-(5-benzyloxy)-indolyl]-γ-keto-propylphosphonic acid, 10.1 grams of potassium hydroxide, and 87 milliliters of water was heated on the steam bath with stirring for eight hours. The mixture was cooled with ice, acidified with twenty milliliters of concentrated hydrochloric acid, and filtered. The recovered solid was washed with water and dried to yield fourteen grams of monoethyl ester of γ-[3-(5-benzyloxy)-indolyl]-γ-keto-propylphosphonic acid which melted at 179 degrees centigrade with effervescence. This product after recrystallization from ethanol melted between 173.5 and 175 degrees centigrade.

Analysis.—Calcd. for $C_{20}H_{22}NO_5P$: C, 62.01; H, 5.72; N, 3.62. Found: C, 61.53; H, 5.64; N, 3.72.

In the same manner other monoalkyl esters of γ-[3-(5-benzyloxy)-indolyl]-γ-keto-propylphosphonic acid are prepared by hydrolyzing the corresponding dialkyl ester of γ-[3-(5-benzyloxy)-indolyl]-γ-keto-propylphosphonic acid, e. g., the monoisopropyl ester of γ-[3-(5-benzyloxy)-indolyl]-γ-keto-propylphosphonic acid, the monobutyl ester of γ-[3-(5-benzyloxy)-indolyl]-γ-keto-propylphosphonic acid, monopropyl ester of γ-[3-(5-benzyloxy)-indolyl]-γ-keto-propylphosphonic acid, monomethyl ester of γ-[3-(1-methyl-5-benzyloxy)-indolyl]-γ-keto-propylphosphonic acid, monopropyl ester of γ-[3-(1-butyl-5-benzyloxy)-indolyl]-γ-keto-propylphosphonic acid, monobutyl ester of γ-[3-(1-hexyl-5-benzyloxy)-indolyl]-γ-keto-propylphosphonic acid, are prepared by hydrolyzing the corresponding dialkyl ester.

EXAMPLE 16

*Monoethyl ester of γ-[3-(1-ethyl-5-benzyloxy)-indolyl]-γ-keto-propylphosphonic acid*

The monoethyl ester of γ-[3-(5-benzyloxy)-indolyl]-γ-keto-propylphosphonic acid (3.87 grams; 0.01 mole) was dissolved in 47 milliliters of ten percent aqueous sodium hydroxide solution and 6.5 milliliters (0.05 mole) of diethyl sulfate was added dropwise while the reaction mixture was stirred and heated on the steam bath. When the exothermic reaction had subsided, 37 milliliters of ten percent aqueous sodium hydroxide solution was added, followed by 6.5 milliliters of diethyl sulfate, and the reaction mixture was stirred and heated for 1.5 hours. The clear yellow alkaline solution was cooled and acidified with twenty milliliters of concentrated hydrochloride acid. The resulting oily material was removed from the mixture by three extractions with chloroform. The combined chloroform extracts were washed with water, then twice with saturated aqueous sodium chloride solution, dried with anhydrous sodium sulfate, and evaporated to dryness at room temperature under vacuum to give 4.0 grams of the monoethyl ester of γ-[3-(1-ethyl-5-benzyloxy)-indolyl]-γ-keto-propylphosphonic acid as a yellow oil.

EXAMPLE 17

*Dimethyl ester of γ-[3-(5-hydroxy)-indolyl]-γ-keto-propylphosphonic acid*

A suspension of 1.94 grams of dimethyl ester of γ-[3-(5-benzyloxy)-indolyl]-γ-keto-propylphosphonic acid in 100 milliliters of 95 percent ethanol was hydrogenated at 48 pounds of hydrogen pressure in the presence of 0.2 gram of palladium-on-carbon catalyst. After five hours 100 milliliters of ethanol was added and the suspension was filtered. The filtrate was evaporated to about five milliliters whereupon crystallization occurred to give 0.53 gram of the dimethyl ester of γ-[3-(5-hydroxy)-indolyl]-γ-keto-propylphosphonic acid which melted at 223 degrees centigrade with decomposition.

Analysis.—Calcd. for $C_{13}H_{16}NO_5P$: C, 52.53; H, 5.43; N, 4.71. Found: C, 52.91; H, 5.56; N, 4.99.

In the same manner the following esters of γ-[3-(5-hydroxy)-γ-keto-propylphosphonic acid are prepared by subjecting the corresponding benzyloxy derivative to hydrogenolysis in the presence of a palladium catalyst: diethyl ester of γ-[3-(5-hydroxy)-indolyl]-γ-keto-propylphosphonic acid, diisopropyl ester of γ-[3-(5-hydroxy)-indolyl]-γ-keto-propylphosphonic acid, dibutyl ester of γ-[3-(5-hydroxy)-indolyl]-γ-keto-propylphosphonic acid, dipropyl ester of γ-[3-(5-hydroxy)-indolyl]-γ-keto-propylphosphonic acid, dimethyl ester of γ-[3-(1-methyl-5-hydroxy)-indolyl]-γ-keto-proylphosphonic acid, diethyl ester of γ-[3-(1-ethyl-5-hydroxy)-indolyl]-γ-keto-propylphosphonic acid, dipropyl ester of γ-[3-(1-butyl-5-hydroxy)-indolyl]-γ-keto-propylphosphonic acid, dibutyl ester of γ-[3-(1-hexyl-5-hydroxy)-indolyl]-γ-keto-propylphosphonic acid, dipropyl ester of γ-[3-(1-amyl-5-hydroxy)-indolyl]-γ-keto-propylphosphonic aicd, monoethyl ester of γ-[3-(5-hydroxy)-indolyl]-γ-keto-propylphosphonic acid, monomethyl ester of γ-[3-(5-hydroxy)-indolyl]-γ-keto-propylphosphonic acid, monoethyl ester of γ-[3-(1-propyl-5-hydroxy)-indolyl]-γ-keto-propylphosphonic acid, monoisopropyl ester of γ-[3-(5-hydroxy)-indolyl]-γ-keto-propylphosphonic acid, monobutyl ester of γ-[3-(5-hydroxy)-indolyl]-γ-keto-propylphosphonic acid, monopropyl ester of γ-[3-(5-hydroxy)-indolyl]-γ-keto-propylphosphonic acid, monomethyl ester of γ-[3-(1-methyl-5-hydroxy)-indolyl]-γ-propylphosphonic acid, monoethyl ester of γ-[3-(1-ethyl-5-hydroxy)-indolyl]-γ-keto-propylphosphonic acid, monopropyl ester of γ-[3-(1-butyl-5-hydroxy)-indolyl-γ-keto-propylphosphonic acid, monobutyl ester of γ-[3-(1-hexyl-5-hydroxy)-indolyl]-γ-keto-propylphosphonic acid, monopropyl ester of γ-[3-(1-amyl-5-hydroxy)-γ-keto-propylphosphonic acid.

EXAMPLE 18

Dimethyl ester of γ-[3-(5-benzyloxy)-indolyl]-γ-keto-propylphosphonic acid

The monomethyl ester of γ-[3-(5-benzyloxy)-indolyl]-γ-keto-propylphosphonic acid was treated with an excess of ethereal diazomethane solution to produce the dimethyl ester or γ-[3-(5-benzloxy)-indolyl]-γ-keto-propylphosphonic acid which melted between 146 and 147 degrees centigrade. This product was shown to be identical with the product of Example 12, by mixed melting point and by infrared comparison.

EXAMPLE 19

Monoethyl ether of γ-(3-indolyl)-γ-keto-propylphosphonic acid

A 1.11 gram sample of monoisopropyl ester of γ-(3-indolyl)-γ-keto-propylphosphonic acid (Example 11) was dissolved in 75 milliliters of boiling water and one milliliter of concentrated hydrochloric acid was added to the mixture. The resulting solution was cooled and allowed to remain in the cold for two hours, during which time crystallization of the desired dibasic acid occurred. The mixture was filtered to give 0.9 gram of γ-(3-indolyl)-γ-keto-propylphosphonic acid which melted between 206 and 209 degrees centigrade.

The γ-(3-indolyl)-γ-keto-propylphosphonic acid was dissolved in ethanol, and to this solution was added an ether solution of diazoethane, the quantity of diazoethane being equimolar with respect to the γ-(3-indolyl)-γ-keto-propylphosphonic acid. The reaction mixture was maintained at about 25 degrees centigrade for four hours, after which it was evaporated to dryness at about 25 degrees centigrade and reduced pressure, to obtain the monoethyl ester of γ-(3-indolyl)-γ-keto-propylphosphonic acid.

EXAMPLE 20

Isopropyl butyl γ-(3-indolyl)-γ-keto-propylphosphonate

An ether solution of diazobutane (0.01 mole) was added to an ethanol solution of the monoisopropyl ester of γ-(3-indolyl)-γ-keto-propylphosphonic acid (0.01 mole). The reaction mixture was allowed to stand at about 25 degrees centigrade for four hours, and was then evaporated to dryness at about 25 degrees centigrade and reduced pressure, to obtain isopropyl butyl γ-(3-indolyl)-γ-keto-propylphosphonate.

In the same manner other mixed esters are prepared by reacting a selected monoalkyl ester with a diazoalkane, e. g., ethyl propyl γ-(3-indolyl)-γ-keto-propylphosphonate is prepared by reacting the monoethyl ester of γ-(3-indolyl)-γ-keto-propylphosphonic acid with diazopropane; methyl butyl γ-(3-indolyl)-γ-keto-propylphosphonate is prepared by reacting the monomethyl ester of γ-(3-indolyl)-γ-keto-propylphosphonic acid with diazobutane; methyl butyl γ-[3-(5-benzyloxy)-indolyl]-γ-keto-propylphosphonate is prepared by reacting the monomethyl ester of γ-[3-(5-benzyloxy)-indolyl]-γ-keto-propylphosphonic acid with diazobutane; methyl ethyl γ-[3-(1-ethyl)-indolyl]-γ-keto-propylphosphonate is prepared by reacting the monoethyl ester of γ-[3-(1-ethyl)-indolyl]-γ-keto-propylphosphonic acid with diazomethane; and ethyl propyl γ-[3-(1-ethyl-5-benzyloxy)-indolyl]-γ-keto-propylphosphonate is prepared by reacting the monoethyl ester of γ-[3-(1-ethyl-5-benzyloxy)-indolyl]-γ-keto-propylphosphonic acid with diazopropane.

It is to be understood that the invention is not to be limited to the exact compounds shown and described, as obvious modifications and equivalents will be apparent to one skilled in the art, and the invention is therefore to be limited only by the scope of the appended claims.

I claim:

1. A compound represented by the following formula:

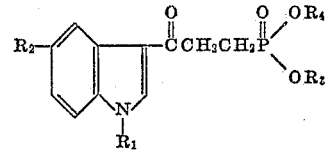

wherein $R_1$ is selected from the group consisting of hydrogen and a lower-alkyl radical containing from one to six carbon atoms, inclusive, $R_2$ is selected from the group consisting of hydrogen and hydroxy, $R_3$ is selected from the group consisting of a primary and a secondary lower-alkyl radical containing from one to four carbon atoms, inclusive, and $R_4$ is selected from the group consisting of hydrogen, an alkali-metal, and a primary and a secondary lower-alkyl radical containing from one to four carbon atoms, inclusive.

2. A compound represented by the following formula:

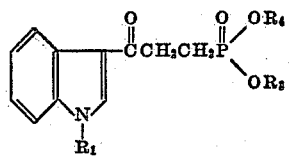

wherein $R_1$ is a lower-alkyl radical containing from one to six carbon atoms, inclusive, and $R_3$ and $R_4$ are primary lower-alkyl radicals containing from one to four carbon atoms, inclusive.

3. A compound represented by the following formula:

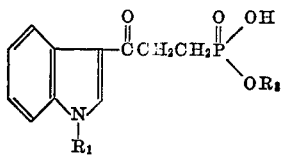

wherein $R_1$ is a lower-alkyl radical containing from one to six carbon atoms, inclusive, and $R_3$ is a primary alkyl radical containing from one to four carbon atoms, inclusive.

4. A compound having the formula:

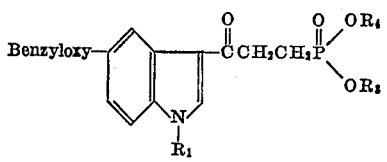

wherein $R_1$ is selected from the group consisting of hydrogen and a lower-alkyl radical containing from one to six carbon atoms, inclusive, $R_3$ is selected from the group consisting of a primary and a secondary lower-alkyl radical containing from one to four carbon atoms, inclusive, and $R_4$ is selected from the group consisting of hydrogen, an alkali-metal, and a primary and a secondary lower-alkyl radical containing from one to four carbon atoms, inclusive.

5. Dimethyl ester of γ-[3-(1-ethyl)-indolyl]-γ-keto-propylphosphonic acid.

6. Dimethyl ester of γ-[3-(5-hydroxy)-indolyl]-γ-keto-propylphosphonic acid.

7. Monoisopropyl ester of γ-(3-indolyl)-γ-keto-propylphosphonic acid.

8. Monoethyl ester of γ-[3-(1-ethyl)-indolyl]-γ-keto-propylphosphonic acid.

9. Diisopropyl ester of γ-(3-indolyl)-γ-keto-propylphosphonic acid.

10. A compound represented by the following formula:

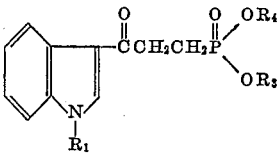

wherein $R_1$ is a lower-alkyl radical containing from one to six carbon atoms, inclusive, and $R_3$ and $R_4$ are secondary lower-alkyl radicals containing from one to four carbon atoms, inclusive.

11. A compound represented by the following formula:

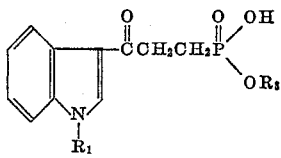

wherein $R_1$ is a lower-alkyl radical containing from one to six carbon atoms, inclusive, and $R_3$ is a secondary lower-alkyl radical containing from one to four carbon atoms, inclusive.

References Cited in the file of this patent

UNITED STATES PATENTS 2,849,454    Smuszkovicz _____ Aug. 26, 1958

UNITED STATES PATENT OFFICE
Certificate of Correction

Patent No. 2,877,234

March 10, 1959

Jacob Szmuszkovicz

It is hereby certified that error appears in the above numbered patent requiring correction and that the said Letters Patent should read as corrected below.

Column 9, line 72, Example 14, for "γ-[3-methyl-" read —γ-[3-(1-methyl- —; column 11, line 39, Example 17, for "γ-propylphosphonic" read —γ-keto-propylphosphonic—; column 11, line 61, Example 19, in the heading thereto, for "*ether*" read —*ester*—.

Signed and sealed this 28th day of July 1959.

[SEAL]

Attest:
KARL H. AXLINE,
*Attesting Officer.*

ROBERT C. WATSON,
*Commissioner of Patents.*